Aug. 9, 1955  C. E. NORDSTROM  2,714,815
TRANSMISSION LOCK
Filed June 18, 1953  2 Sheets-Sheet 1
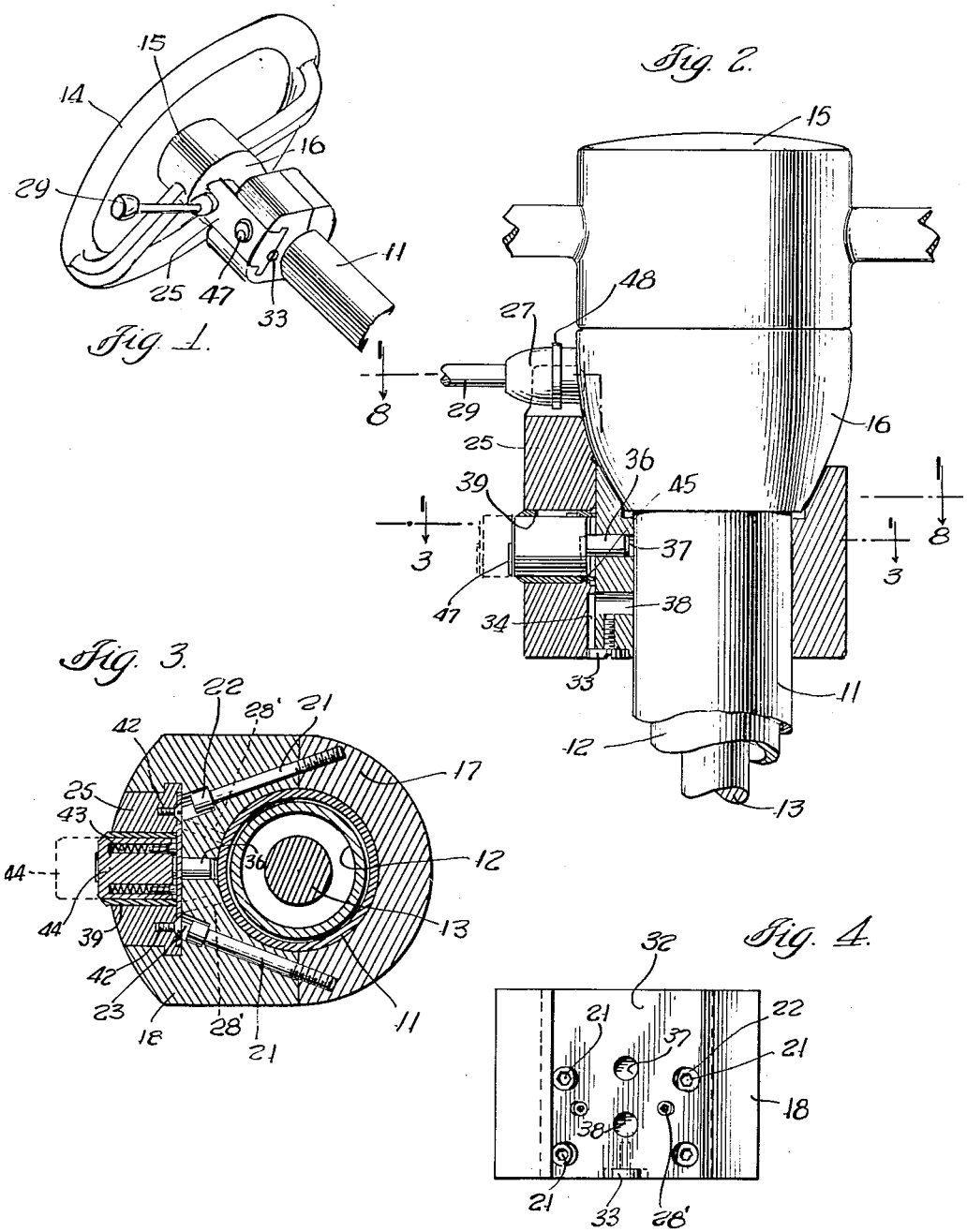
INVENTOR.
Carl E. Nordstrom
BY
Atty Aug. 9, 1955  C. E. NORDSTROM  2,714,815
TRANSMISSION LOCK
Filed June 18, 1953  2 Sheets-Sheet 2
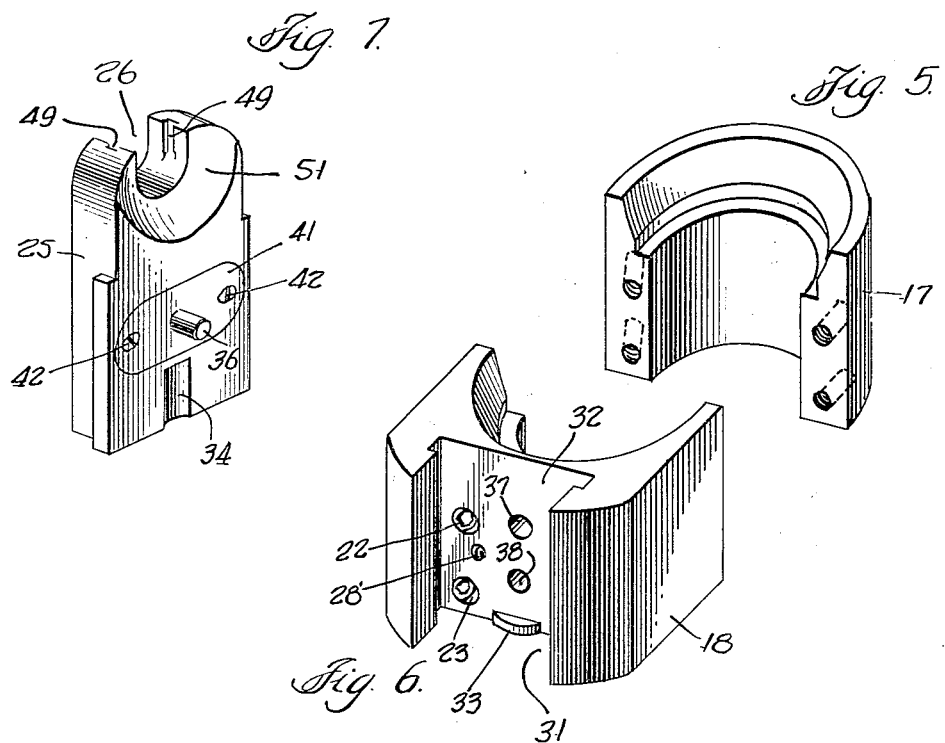
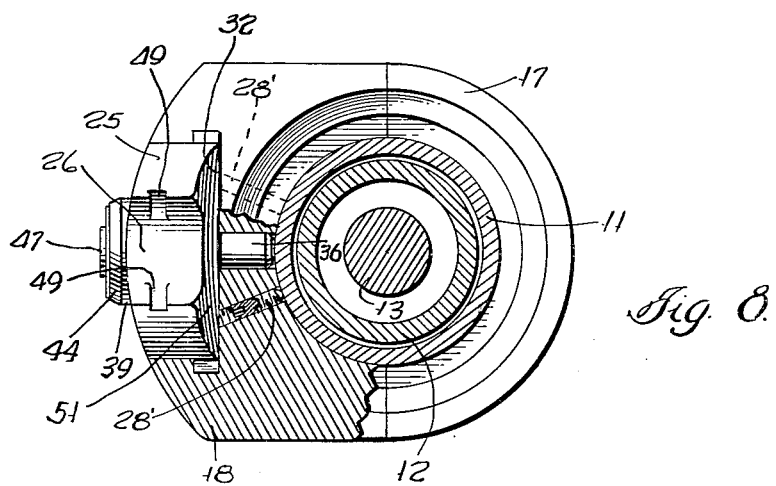
INVENTOR.
Carl E. Nordstrom
BY
atty United States Patent Office 2,714,815
Patented Aug. 9, 1955

2,714,815

TRANSMISSION LOCK

Carl E. Nordstrom, Evanston, Ill.

Application June 18, 1953, Serial No. 362,469

4 Claims. (Cl. 70—211)

The present invention relates to automobile theft prevention locks and concerns itself more particularly with an apparatus of this class which is adapted to secure a vehicle against unauthorized control by immobilizing its transmission shift operating lever.

Recent designs of automobile vehicles are equipped with transmission control levers located below the steering wheel and extending radially in respect to the steering column. A torque tube within the steering column is thereby rotated to a number of radial positions in accordance with each of which there is established a certain driving relationship between the automobile motor and its propellor shaft. Through the rotation of this tubular element by its radially extending arm or lever the driving relationship is adjusted to suit road and travel conditions including, for example, neutral, reverse, and various forward speeds. The immobilization of this lever and the consequent locking of the control in a contrary position effectively thwarts the bodily removal of the vehicle through the use of its own motor power.

Because the locking of the transmission control lever in one arbitrary position, for example, neutral may not be the most effective for all cases and conditions, it is contemplated with the herein proposed apparatus to provide a range of adjustable placement of the lock accessory which may be availed of during initial installation.

It is recognized that the quality of facility in manipulation constitutes an important factor toward insuring the regular use of theft defeating apparatus by automobile drivers, particularly during casual or interim parking. Automobile theft is often the result of neglect to utilize provided equipment because the function of locking up has been made bothersome or incommodious. In other cases of such failures the neglect is attributable to loss of detachable piece parts. With these shortcomings in mind, the herein proposed apparatus was designed to comprise few and simple components which are always integrally associated and which are reached from the driver's position with manifest ease and operated with utmost convenience.

A principal object of the present invention therefore is one of producing a theft prevention apparatus that may be applied upon steering columns in close proximity to transmission shift control levers and comprising integral components easily manipulated and conducive toward the development of regular driver attention during all instances of parking.

Another object of the present invention is to devise a steering column mounted transmission lock which may be securely clamped in position upon the housing tube of an automobile vehicle with elements that are concealed and inaccessible for removal while the device is in locked condition.

Yet another object of the invention is to provide a theft prevention apparatus which though easily accessible for operation is during non-use safely out of the way so as not to interfere with an operator's movement or to conflict with other control apparatus or accessories of a vehicle.

The foregoing and other objects and purposes of the invention will now be explained and described during the course of the following detailed specification referring to the accompanying drawings in which like reference numerals designate corresponding parts throughout, and in which;

Fig. 1 is a perspective view of an automobile steering column having applied thereto a transmission lock which embodies various features of the present invention, Fig. 2 is a fragmentary part-sectional view of the steering wheel and shifting lever hubs together with a portion of the steering column showing applied thereon a lock apparatus which utilizes various features of the present invention, Fig. 3 is a transverse sectional view taken approximately on line 3—3 of Fig. 2, Fig. 4 is a side elevational detail view of one of the lock element housing units with the slide bolt thereof removed, Fig. 5 is a perspective detail view of one of the clamping body components which forms part of the locking apparatus, Fig. 6 is a perspective detail view of the other clamp components, Fig. 7 is a perspective view of the locking bolt observed from the rear, And Fig. 8 is a transverse sectional view taken approximately on line 8—8 of Fig. 2.

Referring now more particularly to the illustrations of the drawings, the steering column of an automobile is designated 11 and comprises a cylindrical outer housing element which contains an intermediate transmission control torque tube 12, and a steering control shaft 13. The manner in which these controls regulate their respective mechanisms is not of importance to this disclosure, hence the showing is confined to the manipulation elements. The steering wheel 14 usually integral with a hub section 15 is secured to the shaft 13, while beneath the hub 15 a collar element 16 is likewise integrally associated with the transmission control tube 12. The transmission control elements are customarily designed so that the full range of supervision is accomplished through a rotation not exceeding 90°.

The outer tube or housing 11 is constructed of sturdy stock and is stably anchored to the floor, dashboard, or the firewall to prevent vibration during uneven road travel. Accordingly the principal body of the lock apparatus comprised of the two shell elements 17 and 18 may be fastened near the upper end of the housing tube just below the transmission control collar and thereat drawn tightly together as indicated in Fig. 2. The two shell elements are predeterminedly proportioned so that they have gripping engagement with the housing 11 when the four draw bolts are tightened. These bolts 21 are provided with heads 22 of the Allen type so as to be submersible in the recesses 23.

When initially installing the device upon a steering post the relative angular position of the body members is gauged to permit the locking bolt to register with the shank portion of the shifting lever 29. Placement of the shank portion 27 into the slot or recess 26 of bolt element 25 may be made while the clamp members are still movable about the housing. In this way the installer may choose from among several positions of disablement as suits preference.

When the desired clamping position is determined the bolts 21 are drawn tight and then the set screws 28' are turned down so that they bite into the tube metal. It is to be noted that whereas the bolts 21 are disposed toward a tangential position so as to occupy massively sturdier parts of the clamp members, set screws 28' are radial to the housing and effect thereby balanced pressure stability against inadvertent loosening by force or vibration.

As best observed in Figs. 3 and 4, the Allen bolts 21 and set screw 28' all extend into their respective holes reached through the surface 32 which during locked condition of the attachment is concealed by the slide bar or fetter element 31, Fig. 6. The slide bolt 25 is guided into its channel of member 18 from the bottom by first removing from its home a retainer screw 33 which is provided with an enlarged head as appears clearly in Figs. 2 and 6. This retaining element disposes an outstanding or protruding portion of its head into the part-cylindrical groove 34 formed in the inner surface of bar 25, limiting the longitudinal movement of the latter to extremities of position in which plug bolt 36 registers with its idle hole 38 or with its security effecting hole 37.

Plug projection 36 is part of a lock unit which includes an outer tube 39 integrated with an escutcheon plate 41 held in place by means of two recessed or countersunk flat head screws 42. Within-contained coil springs 43 try to maintain the barrel 44 of the movable part of the lock unit in retracted or unlocked position under which condition the plug bolt is withdrawn as indicated by dotted outline in Figs. 2 and 3. A moderate force is exerted to return the assembly to its foreward position which is then sustained by a spring loaded latching lug that is retractable upon the key operation of the paracentric cylinder 47, Fig. 8.

Slidable member 25 is a hobble to fetter the rotative movement normally available to collar 16 and lever 29 and its restraint becomes effective when disposed in the position in which it is shown in solid outline, Figs. 1 and 2. During the effective condition, hobble 25 receives in its recess 26 the shank portion 27 of lever 29 nesting it snugly and substantially encompassing it with its sturdy mass. Since some practice is to provide protrusion as by a flange 48 or by spline heads in this region of the shank 27, notches 49 are advantageously formed so that the recess may be made otherwise close-fitting for the purpose of avoiding even small freedom of motion to the control apparatus. In keeping with this precaution the slide bolt may be hollowed out as at 51 to conform with the contour of collar and thereby permit the barrier element to lie very closely to the shank root.

From the foregoing it will be clear that the lock accessory herein taught is a sturdy but simple and foolproof installation which is easily accessible even to sub-average statures or impared reaches, and that it nevertheless lies during idle condition, in an out-of-the-way proximity so as not to interfere with driver control movements.

While the present invention has been explained and described with reference to a specifically contemplated structure, it will be understood that its scope is not thereby to be limited. Modifications and variations are intended to be included as embraced within the language of the hereunto appended claims.

What is considered to be new and for which Letters Patent are requested is:

1. In combination with a supporting body which is comprised of a first clamping member having a semi-cylindrical concavity, a second member having a similar concavity, said concavities comprising a relatively smaller diameter portion for binding embracement of an automobile steering column and a contoured relatively larger diameter portion for marginally clearing a shift control collar at the head of the column, of a shifting lever fettering bar which comprises a track portion slidable in a longitudinal channel formed in said body, and a yoke portion for straddling the shifting lever, said yoke portion being concavely profiled on its inner surface to conform with the curvature continuation of the shift control collar.

2. A locking apparatus for steering column transmission control levers which include a tubular housing and a collar element at the upper extremity of the housing having a larger diameter than that of said housing, said locking apparatus comprising a pair of housing encompassing bodies combinedly providing between them an internal bore for snugly embracing the housing, one of said bodies having a channel undercut on its outer surface in a direction parallel to the axis of the bore and bolt holes extending from the undercut surface to align with threaded apertures in the other of said bodies, whereby said bodies may be securely clamped together, a lock bar having a cross-section which conforms with that of said channel so as to be slidable continuously therethrough, a portion at the upper end of said lock bar contoured to engage a transmission control lever extending from said collar element, a principal portion of said lock bar being adapted to cover access to the bolt holes in said one of said encompassing bodies, and a key-operated spring bolt carried by said lock bar engageable in receiving apertures provided in the undercut channel surface of said encompassing body for securing said lock bar in transmission lever immobilizing position selectively.

3. The combination set forth in claim 2 in which said one of said encompassing bodies includes a retainer screw element at the lower end of said channel for restricting the movement of said lock bar in its downward direction.

4. The combination set forth in claim 2 in which said one of said encompassing bodies is provided with a threaded aperture substantially perpendicular to the encompassed tubular housing bore, and a set screw threadably engaging said aperture adapted to pierce the tubular housing of an encompassed steering column for the purpose of additionally stabilizing said locking apparatus against overpowering.

References Cited in the file of this patent

UNITED STATES PATENTS

| 1,298,853 | Allen | Apr. 1, 1919 |
| 1,381,726 | Marr | June 14, 1921 |
| 1,607,720 | Blaeker | Nov. 23, 1926 |
| 1,738,699 | Billen | Dec. 10, 1929 |